(12) United States Patent
Kim et al.

(10) Patent No.: US 10,822,483 B2
(45) Date of Patent: Nov. 3, 2020

(54) POLYPROPYLENE RESIN COMPOSITION AND MOLDED PRODUCT THEREOF

(71) Applicants: HYUNDAI MOTOR COMPANY, Seoul (KR); KIA MOTORS CORPORATION, Seoul (KR); LG Hausys, Ltd., Seoul (KR); GS CALTEX, Seoul (KR)

(72) Inventors: Hyun Gyung Kim, Hwaseong-si (KR); Hee Joon Lee, Seoul (KR); Seung Jae Lee, Daejeon (KR); Hyung Tak Lee, Daejeon (KR); Ki Hyun Sung, Ulsan (KR); Chun Ho Park, Cheongju-si (KR)

(73) Assignees: Hyundai Motor Company, Seoul (KR); Kia Motors Corporation, Seoul (KR); LG Hausys Ltd., Seoul (KR); GS Caltex, Seoul (KR)

( * ) Notice: Subject to any disclaimer, the term of this patent is extended or adjusted under 35 U.S.C. 154(b) by 10 days.

(21) Appl. No.: 15/839,112

(22) Filed: Dec. 12, 2017

(65) Prior Publication Data

US 2018/0258267 A1 Sep. 13, 2018

(30) Foreign Application Priority Data

Mar. 10, 2017 (KR) .................. 10-2017-0030702

(51) Int. Cl.
| | | |
|---|---|---|
| C08L 23/12 | (2006.01) | |
| C08L 23/16 | (2006.01) | |
| C08L 23/08 | (2006.01) | |
| C08L 25/10 | (2006.01) | |
| C08K 3/013 | (2018.01) | |
| C08K 3/32 | (2006.01) | |
| C08K 3/34 | (2006.01) | |
| C08K 5/00 | (2006.01) | |
| C08L 23/14 | (2006.01) | |
| C08K 5/521 | (2006.01) | |

(52) U.S. Cl.
CPC .............. *C08L 23/12* (2013.01); *C08K 3/013* (2018.01); *C08K 3/32* (2013.01); *C08K 3/346* (2013.01); *C08K 5/521* (2013.01); *C08L 23/0807* (2013.01); *C08L 23/0815* (2013.01); *C08L 23/14* (2013.01); *C08L 23/16* (2013.01); *C08L 25/10* (2013.01); *C08K 5/0083* (2013.01); *C08K 2003/321* (2013.01); *C08K 2201/003* (2013.01); *C08L 2205/24* (2013.01); *C08L 2207/04* (2013.01)

(58) Field of Classification Search
CPC ...... C08L 23/12; C08L 23/16; C08L 23/0807; C08L 25/10; C08L 2205/24; C08L 2207/04; C08K 3/013; C08K 2003/321; C08K 3/346; C08K 5/0083; C08K 3/32
See application file for complete search history.

(56) References Cited

U.S. PATENT DOCUMENTS

| | | | | |
|---|---|---|---|---|
| 2010/0010142 A1* | 1/2010 | Noh | ............... | C08L 33/10 524/451 |
| 2016/0185954 A1* | 6/2016 | Lee | ............... | C08L 67/04 524/139 |

FOREIGN PATENT DOCUMENTS

| | | | |
|---|---|---|---|
| JP | 2014-091781 | * | 5/2014 |
| JP | 2014-091781 A | | 5/2014 |
| KR | 10-2016-0057528 | * | 5/2016 |
| KR | 10-2016-0057528 A | | 5/2016 |

* cited by examiner

*Primary Examiner* — Robert D Harlan
(74) *Attorney, Agent, or Firm* — Morgan, Lewis & Bockius LLP

(57) ABSTRACT

A polypropylene resin composition includes: a base resin including a propylene homopolymer having a melt index of 20 g/10 min to 35 g/10 min measured at a temperature of 230° C. and under a load of 2.16 kg and an ethylene-propylene copolymer having a melt index of 90 g/10 min to 100 g/10 min measured at a temperature of 230° C. and under a load of 2.16 kg; a thermoplastic elastomer having a melt index of 10 g/10 min to 40 g/10 min measured at a temperature of 230° C. and under a load of 2.16 kg; an inorganic filler; and a sodium phosphate-based nucleating agent.

18 Claims, No Drawings

POLYPROPYLENE RESIN COMPOSITION AND MOLDED PRODUCT THEREOF

CROSS-REFERENCE TO RELATED APPLICATION

This application claims under 35 U.S.C. § 119(a) the benefit of priority to Korean Patent Application No. 10-2017-0030702 filed Mar. 10, 2017, the entire content of which is incorporated herein by reference.

TECHNICAL FIELD

The present disclosure relates to a polypropylene resin composition and a molded product thereof.

BACKGROUND

Automobiles have been developed in a direction, which increases the weight to satisfy requirements such as the securing of passenger's safety, the increasing in a size of a chassis, and the enhancing of the quality of design. However, the reduction in fuel consumption due to the increase in weight leads to increases in amount of fuel consumed and amount of carbon dioxide emitted, and as a result, it is difficult to comply with the environmental regulations which are becoming more and more stringent every year. Thus, a reduction in weight of a chassis has been rapidly required.

A bumper cover, which is one of the parts having a large specific gravity among automobile exterior materials, serves to absorb an external impact and protect front and rear parts of a vehicle. The bumper cover requires an excellent mechanical rigidity in order to prevent a deformation caused by an external force. Further, during a molding process, the molding cycle needs to be shortened, and the workability and the appearance need to be excellent.

Accordingly, an automobile exterior material such as a bumper cover requires simultaneous maintenance of excellent mechanical properties and moldability together with the reduction in weight.

In terms of the reduction in weight of automobile parts, there are cases where a MuCell process or a chemical foaming process is applied, but there still remain problems in that the appearance is poor, it is difficult to mold automobile parts, and physical properties deteriorate.

As another example of the reduction in weight, there are cases where a glass bubble having a 3D-hallow structure (microsphere) is used, but a technology of preventing the glass bubble from being damaged during processing and a compatibility problem of the glass bubble with a polypropylene resin are not easily solved, and there are significant technical difficulties in terms of commercial use, such as experience of rapid reduction in impact and rigidity. Therefore, there is a limitation in thinning parts for an automobile.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure has been made in an effort to solve the above-described problems associated with prior art.

An aspect of the present disclosure provides a polypropylene resin composition, which may impart excellent mechanical rigidity and impact resistance even when applied to a molded product having a small thickness, while maintaining a low specific gravity.

In an exemplary embodiment of the present disclosure, a polypropylene resin composition includes: a base resin including a propylene homopolymer having a melt flow index of 20 g/10 min to 35 g/10 min measured at a temperature of 230° C. and under a load of 2.16 kg and an ethylene-propylene copolymer having a melt flow index of 90 g/10 min to 100 g/10 min measured at a temperature of 230° C. and under a load of 2.16 kg; a thermoplastic elastomer having a melt flow index of 10 g/10 min to 40 g/10 min measured at a temperature of 230° C. and under a load of 2.16 kg; an inorganic filler; and a sodium phosphate-based nucleating agent.

In another embodiment of the present disclosure, a molded product includes an injection molding of the polypropylene resin composition.

The polypropylene resin composition may impart excellent mechanical rigidity and impact resistance even when applied to a molded product having a small thickness, while maintaining a low specific gravity.

Other aspects and preferred embodiments of the invention are discussed infra.

It is understood that the term "vehicle" or "vehicular" or other similar terra as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The benefits and features of the present disclosure and the methods of achieving the benefits and features will become apparent with reference to Examples to be described below. However, the present disclosure is not limited to Examples to be disclosed below, but may be implemented in various other forms, and the present Examples are only provided for rendering the disclosure of the present disclosure complete and for fully representing the scope of the invention to a person with ordinary skill in the art to which the present disclosure pertains, and the present disclosure will be defined only by the scope of the claims.

In one aspect, the present disclosure provides a polypropylene resin composition including: a base resin including a propylene homopolymer having a melt flow index of about 20 g/10 min to about 35 g/10 min measured at a temperature of 230° C. and under a load of 2.16 kg and an ethylene-propylene copolymer having a melt flow index of about 90 g/10 min to about 100 g/10 min measured at a temperature of 230° C. and under a load of 2.16 kg; a thermoplastic elastomer having a melt flow index of about 10 g/10 min to about 40 g/10 min measured at a temperature of 230° C. and under a load of 2.16 kg; an inorganic filler; and a sodium phosphate-based nucleating agent.

The polypropylene resin composition appropriately includes a base resin including a propylene homopolymer and an ethylene-propylene copolymer, a thermoplastic elastomer, an inorganic filler, and a sodium phosphate-based nucleating agent, and thus may increase the crystallinity of the base resin and may impart excellent mechanical rigidity and impact resistance. That is, the polypropylene resin composition may impart excellent processability and high tensile strength, flexural modulus, and impact strength even when applied to a molded product having a small thickness, while maintaining a low specific gravity.

The polypropylene resin composition includes a base resin including a propylene homopolymer and an ethylene-propylene copolymer, and thus may simultaneously impart excellent impact resistance while sufficiently maintaining excellent mechanical strength, and may impart excellent processing effects due to excellent flowability.

Specifically, the base resin may include the propylene homopolymer to the ethylene-propylene copolymer at a weight ratio of about 1:9 to about 3:7. When the weight ratio of the propylene homopolymer is less than the range, the strength heat resistance, and the like may be insufficient, and when the weight ratio of the ethylene-propylene copolymer is less than the range, the impact resistance may not be sufficient.

The polypropylene resin composition includes the base resin including the propylene homopolymer and the ethylene-propylene copolymer in an amount of about 50 wt % to about 75 wt %, and thus may impart excellent processability while being economically efficient.

The base resin may simultaneously impart excellent mechanical strength and excellent impact resistance by including a propylene homopolymer having a melt flow index of about 20 g/10 min to about 35 g/10 min measured at a temperature of 230° C. and under a load of 2.16 kg. For example, when the melt flow index of the propylene homopolymer is less than the range, impregnation properties of the inorganic filler, and the like deteriorate, so that the reinforcing effects may be reduced. Furthermore, when the melt flow index of the propylene homopolymer is more than the range, the impact resistance may deteriorate.

The propylene homopolymer may have a pentad fraction (% mmmm) of about 96% or more measured by 13C-NMR. Specifically, the pentad fraction may be about 96.5% or more, for example, about 97% or more. The term 'pentad fraction' represents an abundance ratio of an isotactic chain in a pentad unit in a molecular chain, measured by using $^{13}$C-NMR, and means a fraction of propylene monomer units being present at the center of a chain in which 5 propylene monomer units are continuously meso-bonded. The polypropylene resin composition may impart excellent mechanical strength and impact resistance by including a propylene homopolymer having a pentad fraction within the range in a base resin.

The propylene homopolymer may have an intrinsic viscosity [η] of about 0.7 dl/g to about 2.5 dl/g measured in decalin at 135° C. Specifically, the intrinsic viscosity may be about 0.85 dl/g to about 2.2 dig, for example, about 0.9 dl/g to about 2.0 dl/g. When the intrinsic viscosity of the pro-pylene homopolymer is less than the range, the impact resistance may deteriorate, and when the intrinsic viscosity is more than the range, the moldability may deteriorate.

The base resin may simultaneously impart excellent mechanical strength and excellent impact resistance by including an ethylene-propylene copolymer having a melt flow index of about 90 g/10 min to about 100 g/10 min measured at a temperature of 230° C. and under a load of 2.16 kg. For example, when the melt flow index of the ethylene-propylene copolymer is less than the range, impregnation properties of the inorganic filler, and the like deteriorate, so that the reinforcing effects may be reduced. Furthermore, when the melt flow index of the ethylene-propylene copolymer is more than the range, the impact resistance may deteriorate.

The ethylene-propylene copolymer may have a weight average molecular weight of about 70,000 g/mol to about 120,000 g/mol and a specific gravity of about 0.89 to about 0.91.

The ethylene-propylene copolymer may have an intrinsic viscosity [q] of about 3.0 dl/g to about 6.0 dl/g measured in decalin at 135° C. in a xylene extract. Specifically, the intrinsic viscosity may be about 3.5 dl/g or more, for example, about 4.0 dl/g or more. When the intrinsic viscosity of the ethylene-propylene copolymer is less than the range, the impact strength may deteriorate.

More specifically, the ethylene-propylene copolymer may be formed by copolymerizing a propylene monomer and an ethylene monomer at a weight ratio of about 5:1 to about 25:1. That is, the ethylene-propylene copolymer may include ethylene in an amount of about 3 wt % to about 30%, more specifically, about 3 wt % to about 17 wt %. When the content of ethylene included in the ethylene-propylene copolymer is less than the range, the impact resistance may deteriorate, and when the content is more than the range, the rigidity may deteriorate, and the productivity may be reduced during the extrusion.

The polypropylene resin composition may impart excellent impact resistance and heat resistance and high elasticity, and may show excellent injection moldability by including a thermoplastic elastomer having a melt flow index of about 10 g/10 min to about 40 g/10 min measured at a temperature of 230° C. and under a load of 2.16 kg. Specifically, when the melt flow index of the thermoplastic elastomer is less than the range, the flowability deteriorates, and as a result, the dispersion force in the polypropylene resin composition may be reduced, and when the melt flow index is more than the range, the impact resistance and the surface impact property may deteriorate.

The thermoplastic elastomer may be included in a content of about 13 parts by weight to about 50 parts by weight based on 100 parts by weight of the base resin. For example, the thermoplastic elastomer may be included in a content of about 20 parts by weight to about 40 parts by weight based on 100 parts by weight of the base resin. Specifically, when the content of the thermoplastic elastomer is less than the range, the impact resistance may deteriorate, and when the range is more than the range, the flowability may deteriorate and the dispersion force may be reduced.

The thermoplastic elastomer may include one selected from the group consisting of a copolymer of ethylene and an α-olefin having 4 to 12 carbon atoms, a styrene-diene copolymer, and a combination thereof. Specifically, the copolymer may include an α-olefin having 3 to 12 carbon atoms in an amount of about 12 wt % to about 45 wt %.

More specifically, the copolymer of ethylene and the α-olefin having 4 to 12 carbon atoms may be an ethylenebutene-1 copolymer (EBR) or an ethylene-octene-1 copolymer (EOR). The thermoplastic elastomer may include a styrene-diene copolymer prepared by copolymerizing a styrene-based monomer and a diene-based monomer. For example, the styrene-based monomer may be one selected from the group consisting of styrene, α-methyl styrene, α-ethyl styrene, p-methyl styrene, and a combination thereof. The diene-based monomer may be one selected from the group consisting of butadiene, isoprene, and a combination thereof. Specifically, the styrene-diene copolymer may be one copolymer selected from the group consisting of a styrene-butylene-styrene block copolymer, a styrene-ethylene-butylene-styrene block copolymer, a styrene-isoprene-styrene block copolymer, a styrene-ethylene-propylene block copolymer, a styrene-ethylene-propylene-styrene block copolymer, and a combination thereof.

The propylene resin composition includes an inorganic filler, and thus may impart excellent mechanical strength, impact resistance, and dimensional stability. For example, the inorganic filler may be included in a content of about 20 parts by weight to about 50 parts by weight based on 100 parts by weight of the base resin.

Specifically, the inorganic filler may include talc, which is a magnesium silicate hydrate, and the talc has a specific gravity of about 2.7 g/cm$^3$ to about 2.8 g/cm$^3$ and a plate-like structure. The talc may include small amounts of aluminum oxide, calcium oxide, iron oxide, and the like, together with silicic acid and magnesium oxide.

More specifically, the talc may have an average particle diameter of more than about 10 μm and about 40 μm or less, for example, an average particle diameter of more than about 10 μm and about 20 μm or less. The average particle diameter may be measured by a laser diffraction method (ISO 13320-1), and when the average particle diameter of the talc is equal to or less than the range, the talc fails to exhibit sufficient reinforcing effects in a resin, and as a result, a flexural strength may deteriorate. Further, when the average particle diameter of the talc is more than the range, the flowability of the polypropylene resin composition including the talc may deteriorate.

The polypropylene resin composition includes a sodium phosphate nucleating agent, and thus may improve the crystallinity of a base resin including a propylene homopolymer and an ethylene-propylene copolymer, and may further improve mechanical strength and heat resistance.

The sodium phosphate-based nucleating agent is included in a content of about 0.1 part by weight to about 4 parts by weight based on 100 parts by weight of the base resin, and thus may impart excellent mechanical strength and impact resistance, and specifically, may be included in a content of about 0.6 part by weight to about 4 parts by weight. Specifically, when the content of the sodium phosphate-based nucleating agent is less than the range, the tensile strength and the flexural strength may deteriorate, and when the content is more than the range, the impact strength may deteriorate.

Specifically, the sodium phosphate nucleating agent may include a compound represented by the following Chemical Formula 1,

[Chemical Formula 1]

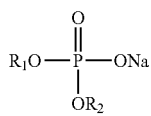

In Chemical Formula 1, R1 and R2 may be each independently hydrogen, a substituted or unsubstituted C1 to C10 alkyl group, the following Chemical Formula 2, or the following Chemical Formula 3 formed by linking R1 and R2 to each other.

[Chemical Formula 2]

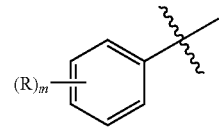

[Chemical Formula 3]

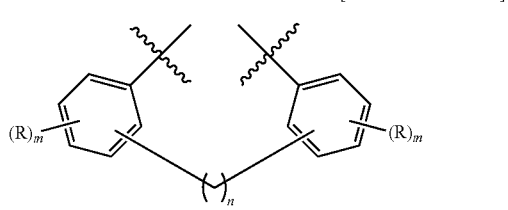

In Chemical Formulae 2 and 3, R may be each independently a substituted or unsubstituted C1 to C10 alkyl group, m may be an integer from 0 to 3, and n may be an integer from 0 to 3.

Specifically, the sodium phosphate nucleating agent may be a compound represented by the following Chemical Formula 4.

[Chemical Formula 4]

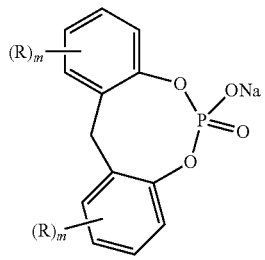

In Chemical Formula 4, R may be a substituted or unsubstituted C1 to C10 alkyl group, and m may be an integer from 0 to 3.

The alkyl group may be an alkyl group selected from a methyl group, an ethyl group, a normal-propyl group, an isopropyl group, a normal-butyl group, and a tert-butyl group.

Specifically, the sodium phosphate-based nucleating agent may be one selected from a 2,2'-methylene-bis-(4,6-di-tert-butylphenyl)phosphate sodium salt, a 2,2'-methylene-bis-(4-tert-butylphenyl)phosphate sodium salt, and a combination thereof.

The polypropylene resin composition may further include one additive selected from the group consisting of a compatibilizer, a coupling agent, a slip agent, an antioxidant, a neutralizer, a light stabilizer, an antistatic agent, and a combination thereof.

A compatibilizer may be a polyolefin-based compatibilizer, and the like, and may increase compatibility between the resins included in the polypropylene resin composition such as the propylene homopolymer.

The compatibilizer may improve interfacial adhesion strength between the resins included in the polypropylene resin composition and a dispersion efficiency, thereby improving excellent mechanical properties, dimensional stability, and surface quality in a molded product which is an injection molding of the composition.

Specifically, the polyolefin-based compatibilizer may use a saturated block copolymer including a styrene-based monomer.

A coupling agent improves compatibility of the inorganic filler with the resin included in the polypropylene resin composition, and may impart excellent mechanical rigidity and impact resistance and may simultaneously impart dimensional stability by increasing the compatibility to improve the dispersibility.

Specifically, the coupling agent is a modified polypropylene resin including a reactive group having reactivity with an inorganic filler at the main chain or ends of polypropylene, and examples of the reactive group include maleic acid, anhydrous maleic acid, carboxylic acid, a hydroxyl group, vinyl acetate, glycidyl methacrylate, vinyl oxazoline, acrylic acid, and the like.

A slip agent improves scratch resistance by imparting a slip property to a surface of a molded product which is an injection molding of the polypropylene resin composition, and may be one selected from the group consisting of a siloxane-based slip agent, an amide-based slip agent, and a combination thereof.

An antioxidant may be one selected from the group consisting of a phenol-based antioxidant, a phosphite-based antioxidant, thiodipropionate, and a combination thereof.

The polypropylene resin composition may use calcium stearate, zinc oxide, and the like as a neutralizer, and may use a hindered amine-based light stabilizer, and the like as a light stabilizer.

An antistatic agent is included in a polypropylene resin composition, and thus has a characteristic of preventing dirt or micro particles from being adsorbed onto the surface of a product by electrostatic attraction, and the antistatic agent may be one selected from the group consisting of an alkyl amine-based antistatic agent, an amine-based antistatic agent, a stearic acid-based antistatic agent, and a combination thereof.

In another aspect, the present disclosure provides a molded product including an injection molding of the polypropylene resin composition. The molded product includes an injection molding of the above-described polypropylene resin composition, and may have reduction in weight and may simultaneously have excellent mechanical rigidity and impact resistance. Accordingly, the injection molding may show excellent mechanical rigidity and impact resistance even though having a small thickness.

Specifically, the molded product has a small thickness, and thus may further reduce the weight and simultaneously have excellent mechanical rigidity and impact resistance. For example, the molded product may show excellent mechanical strength and impact resistance even in a thickness of less than about 2.5 mm. The molded product may have a thickness of about 2.0 mm to about 2.2 mm. Accordingly, the molded product may be suitable for being used as an exterior material for an automobile, such as a bumper. Specifically, the polypropylene resin composition includes: a base resin including a propylene homopolymer having a melt flow index of 20 g/10 min to 35 g/10 min measured at a temperature of 230° C. and under a load of 2.16 kg and an ethylene-propylene copolymer having a melt flow index of 90 g/10 min to 100 g/10 min measured at a temperature of 230° C. and under a load of 2.16 kg; a thermoplastic elastomer having a melt flow index of 10 g/10 min to 40 g/10 min measured at a temperature of 230° C. and under a load of 2.16 kg; an inorganic filler; and a sodium phosphate-based nucleating agent. The matters on the polypropylene resin composition are the same as those described above.

Specifically, the molded product has excellent impact strength not only at room temperature, but also at low temperature, and thus may prevent a phenomenon in which the molded product is broken even in the winter time. Further, the injection molding of the polypropylene resin composition has a high heat distortion temperature together with excellent impact strength, and thus is suitable for being used as an exterior material for an automobile.

The polypropylene resin composition may impart high fluidity and excellent mechanical rigidity, impact resistance, and dimensional stability, and a molded product for an automobile exterior material, including an injection molding of the polypropylene resin composition, may simultaneously secure excellent moldability and excellent mechanical properties together with thin film and reduction in weight.

The molded product may be used as an exterior material for an automobile. Specific examples of the exterior material include a bumper, a spoiler, a side visor, a cowl vent grille, a radiator grille, a side molding, an end panel garnish, and the like.

Hereinafter, specific examples of the present disclosure will be suggested. However, the Examples described below are only provided for specifically exemplifying or explaining the present disclosure, and the present disclosure is not limited thereby.

EXAMPLES

The following examples illustrate the invention and are not intended to limit the same.

Example 1

A base resin including: a propylene homopolymer having a pentad fraction (% mmmm) of 99% measured by 13C-NMR and a melt flow index of 30 g/10 min measured at 230° C. and under a load of 2.16 kg; and an ethylene-propylene copolymer having a melt flow index of 92 g/10 min measured at 230° C. and including ethylene in an amount of about 6 wt % was prepared. At this time, the base resin includes the propylene homopolymer to the ethylene-propylene copolymer at a weight ratio of 15:40.

An ethylene-butene-1 copolymer (EBM) having a melt index of 15 g/10 min measured at 230° C. and under a load condition of 2.16 kg as a thermoplastic elastomer was mixed with 55 wt % of the base resin. At this time, the thermoplastic elastomer is included in a content of about 33 parts by weight based on 100 parts by weight of the base resin.

A talc having an average particle diameter of about 15 μm as an inorganic filler was mixed in a content of about 29 parts by weight based on 100 parts by weight of the base resin.

A polypropylene resin composition was prepared by mixing a 2,2'-methylene-bis-(4,6-di-tert-butylphenyl)phosphate sodium salt as a nucleating agent in a content of about 1.8 parts by weight based on 100 parts by weight of the base resin.

The polypropylene resin composition was extruded under a processing condition of 200° C. to 240° C. by using a twin screw extruder.

Example 2

A polypropylene resin composition was prepared in the same manner as in Example 1, except that a 2,2'-methylenebis-(4,6-di-tert-butylphenyl)phosphate sodium salt being a nucleating agent was mixed in a content of about 0.09 part by weight based on 100 parts by weight of the base resin.

Example 3

A polypropylene resin composition was prepared in the same manner as in Example 1, except that a 2,2'-methylene-bis-(4,6-di-tert-butylphenyl)phosphate sodium salt being a nucleating agent was mixed in a content of about 5 parts by weight based on 100 parts by weight of the base resin.

Comparative Example 1

A polypropylene resin composition was prepared in the same manner as in Example 1, except that dibenzylidene sorbitol was used as a nucleating agent.

Test Examples

Evaluation

Test Example 1: Specific Gravity

The specific gravities of the samples prepared in the Examples and the Comparative Example were measured in accordance with ASTM D792, and the results are shown in [Table 1].

Test Example 2: Melt Index

The melt indices of the polypropylene resin compositions prepared in the Examples and the Comparative Example were measured at 230° C. and under a load of 2.16 kg in accordance with ASTM D1238 method, and the results are shown in [Table 1].

Test Example 3: Tensile Strength

The tensile strengths of the samples prepared in the Examples and the Comparative Example were measured at 23° C. by using ASTM 0638, and the results are shown in [Table 1].

Test Example 4: Flexural Strength

The flexural strengths of the samples prepared in the Examples and the Comparative Example were measured at 23° C. in accordance with ASTM D790, and the results are shown in [Table 1].

Test Example 5: Flexural Modulus

The flexural moduli of the samples prepared in the Examples and the Comparative Example were measured under a condition of a rate of 10 mm/min by using ASTM D790, and the results are shown in [Table 1].

Test Example 6: IZOD Impact Strength

The IZOD impact strengths of samples prepared in the Examples and the Comparative Example were measured at room temperature (23° C.) and a temperature of −30° C., respectively under a ¼" notched condition in accordance with ASTM 0256, and the results are shown in [Table 1].

Test Example 7: Heat Distortion Temperature

The heat distortion temperatures of the samples prepared in the Examples and the Comparative Example were measured by applying a surface pressure of 1.82 MPa using ASTM 0648, and the results are shown in [Table 1].

TABLE 1

| Classification | Example 1 | Example 2 | Example 3 | Comparative Example 1 |
|---|---|---|---|---|
| Specific gravity (g/cm$^3$) | 1.0 | 1.0 | 1.0 | 1.0 |
| Melt index (g/10 min) | 42 | 41 | 42 | 40 |
| Tensile strength (MPa) | 23 | 21 | 23 | 20 |
| Flexural strength (MPa) | 37 | 29 | 36 | 27.5 |
| Flexural modulus (GPa) | 2,450 | 2,200 | 2,400 | 2,000 |
| IZOD impact strength (J/m) @23 | 350 | 345 | 240 | 350 |
| IZOD impact strength (J/m) @−30 | 35 | 34 | 21 | 35 |
| Heat distortion temperature ° C. | 132 | 130 | 132 | 132 |

As shown in Table 1, it was confirmed that the Examples showed excellent mechanical rigidity and impact resistance while maintaining a low specific gravity, and thus had an excellent property balance. In particular, it can be seen that the Examples simultaneously had excellent impact strengths while having high flexural strengths and flexural moduli, unlike the Comparative Example.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene resin composition comprising:
a base resin comprising a propylene homopolymer having a melt index of 20 g/10 min to 35 g/10 min measured at a temperature of 230° C. and under a load of 2.16 kg and an ethylene-propylene copolymer having a melt index of 90 g/10 min to 100 g/10 min measured at a temperature of 230° C. and under a load of 2.16 kg;
a thermoplastic elastomer having a melt index of 10 g/10 min to 40 g/10 min measured at a temperature of 230° C. and under a load of 2.16 kg;
an inorganic filler; and
a sodium phosphate-based nucleating agent,
wherein the propylene homopolymer has an intrinsic viscosity (ii) of about 0.7 dl/g to about 2.5 dl/g measured in decalin at 135° C. in a xylene extract,
wherein the ethylene-propylene copolymer has an intrinsic viscosity (ii) of about 3.0 dl/g to about 6.0 dl/g measured in decalin at 135° C. in a xylene extract, and
wherein the thermoplastic elastomer comprises one selected from the group consisting of a copolymer of ethylene and an α-olefin having 4 to 12 carbon atoms.

2. The polypropylene resin composition of claim 1, wherein the base resin comprises the propylene homopolymer to the ethylene-propylene copolymer at a weight ratio of 1:9 to 3:7.

3. The polypropylene resin composition of claim 1, wherein the polypropylene resin composition comprises the base resin in an amount of 50 wt % to 75 wt %.

4. The polypropylene resin composition of claim 1, wherein the propylene homopolymer has a pentad fraction (% mmmm) of 96% or more measured by 13C-NMR.

5. The polypropylene resin composition of claim 1, wherein the ethylene-propylene copolymer comprises ethylene in an amount of 3 wt % to 17 wt %.

6. The polypropylene resin composition of claim 1, wherein the thermoplastic elastomer is comprised in an amount of 13 parts by weight to 50 parts by weight based on 100 parts by weight of the base resin.

7. The polypropylene resin composition of claim 1, wherein the inorganic filler comprises a talc having an average particle diameter of more than 10 μm and 40 μm or less.

8. The polypropylene resin composition of claim 1, wherein the inorganic filler is comprised in an amount of 20 parts by weight to 50 parts by weight based on 100 parts by weight of the base resin.

9. The polypropylene resin composition of claim 1, wherein the sodium phosphate nucleating agent comprises a compound represented by the following Chemical Formula 1:

[Chemical Formula 1]

in Chemical Formula 1, $R_1$ and $R_2$ are each independently hydrogen, a substituted or unsubstituted C1 to C10 alkyl group, the following Chemical Formula 2, or the following Chemical Formula 3 formed by linking $R_1$ and $R_2$ to each other,

[Chemical Formula 2]
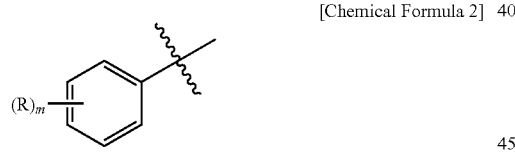

[Chemical Formula 3]
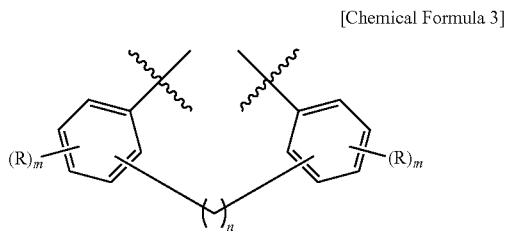

in Chemical Formulae 2 and 3, R is each independently a substituted or unsubstituted C1 to C10 alkyl group, m is an integer from 0 to 3, and n is an integer from 0 to 3.

10. The polypropylene resin composition of claim 1, wherein the sodium phosphate nucleating agent is a compound represented by the following Chemical Formula 4:

[Chemical Formula 4]
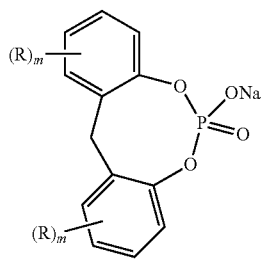

in Chemical Formula 4, R is a substituted or unsubstituted C1 to C10 alkyl group, and m is an integer from 0 to 3.

11. The polypropylene resin composition of claim 1, wherein the sodium phosphate-based nucleating agent is comprised in an amount of 0.1 part by weight to 4 parts by weight based on 100 parts by weight of the base resin.

12. A molded product comprising an injection molding of the polypropylene resin composition which includes:
a base resin comprising a propylene homopolymer having a melt index of 20 g/10 min to 35 g/10 min measured at a temperature of 230° C. and under a load of 2.16 kg and an ethylene-propylene copolymer having a melt index of 90 g/10 min to 100 g/10 min measured at a temperature of 230° C. and under a load of 2.16 kg;
a thermoplastic elastomer having a melt index of 10 g/10 min to 40 g/10 min measured at a temperature of 230° C. and under a load of 2.16 kg; an inorganic filler; and
a sodium phosphate-based nucleating agent,
wherein the propylene homopolymer has an intrinsic viscosity (ii) of about 0.7 dl/g to about 2.5 dl/g measured in decalin at 135° C. in a xylene extract,
wherein the ethylene-propylene copolymer has an intrinsic viscosity (ii) of about 3.0 dl/g to about 6.0 dl/g measured in decalin at 135° C. in a xylene extract, and
wherein the thermoplastic elastomer comprises one selected from the group consisting of a copolymer of ethylene and an α-olefin having 4 to 12 carbon atoms.

13. The polypropylene resin composition of claim 1, wherein the sodium phosphate nucleating agent is 2,2'-methylene-bis-(4,6-di-tert-butylphenyl)phosphate sodium salt.

14. The polypropylene resin composition of claim 1, wherein the sodium phosphate nucleating agent is bis-(2,2'-methylene-bis(4-tert-butylphenyl)phosphate sodium salt.

15. The polypropylene resin composition of claim 1, wherein the ethylene-propylene copolymer is obtained by copolymerizing a propylene monomer unit and an ethylene monomer unit at a weight ratio of 5:1 to about 25:1.

16. The polypropylene resin composition of claim 1, wherein the ethylene-propylene copolymer comprises an ethylene monomer unit in an amount of about 3 wt % to about 30 wt %.

17. The polypropylene resin composition of claim 1, further comprising at least one additive selected from the group consisting of compatibilizer, a coupling agent, a slip agent, an antioxidant, a neutralizer, a light stabilizer and an antistatic agent.

18. The polypropylene resin composition of claim 17, wherein the compatibilizer includes a polyolefin-based compatibilizer.

* * * * *